Figure 1:
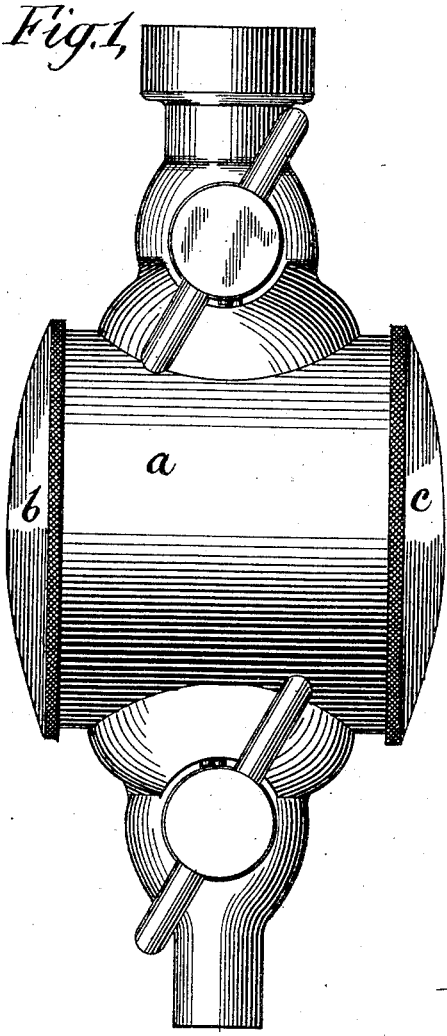

No. 682,353. Patented Sept. 10, 1901.
J. F. GEISLER.
FILTER.
(Application filed May 27, 1901.)
(No Model.)

WITNESSES:
Harry Goss.

INVENTOR
Joseph F. Geisler
BY
E. M. Marbleson
ATTORNEYS

UNITED STATES PATENT OFFICE.

JOSEPH F. GEISLER, OF NEW YORK, N. Y.

FILTER.

SPECIFICATION forming part of Letters Patent No. 682,353, dated September 10, 1901.

Application filed May 27, 1901. Serial No. 62,033. (No model.)

*To all whom it may concern:*

Be it known that I, JOSEPH F. GEISLER, a citizen of the United States, residing at New York, in the county of New York and State of New York, have invented a certain new and useful Improvement in Filters; and I do hereby declare the following to be a full, clear, and exact description of the invention, such as will enable others skilled in the art to which it appertains to make and use the same.

My invention relates to improvements in filters, and more especially to that class of filters designed to be directly connected to faucets of water-supply pipes; and my invention consists in the novel combination, construction, and arrangement of the parts.

The objects of my invention are to render it more easy to cleanse the filtering medium of filters, to facilitate the removal and replacement of the filtering material, and to make the filter as simple, compact, efficient, and inexpensive as possible. These objects are attained in the invention herein described, and illustrated in the drawings which accompany and form a part of this specification, and in which—

Figure 2:
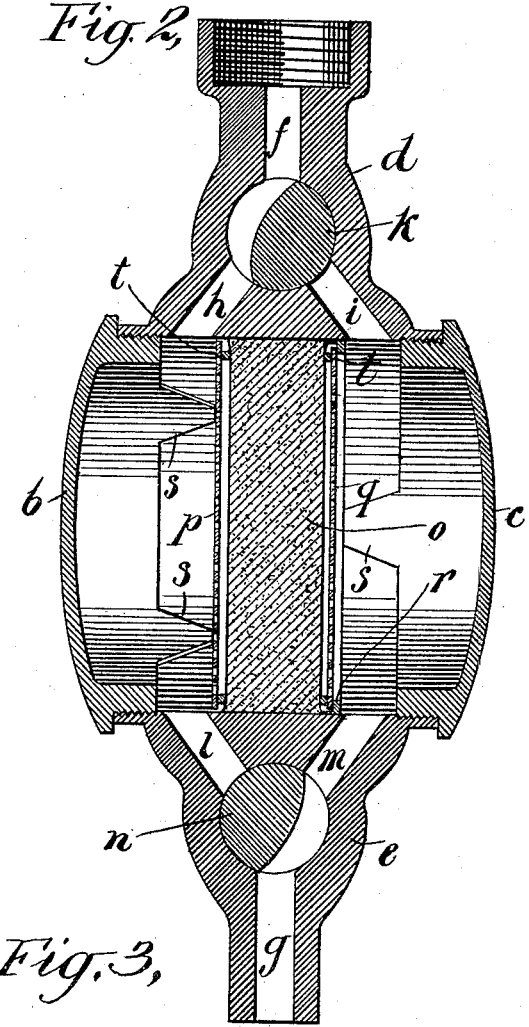
Figure 3:
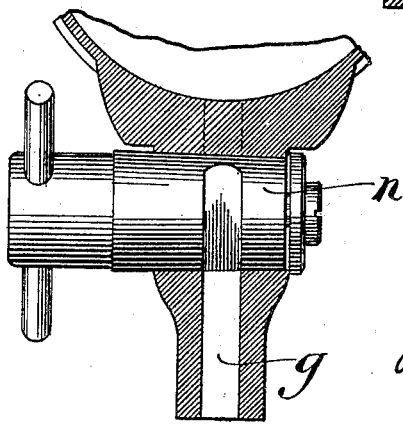

Figure 1 is a side elevation of my improved filter. Fig. 2 is a longitudinal section thereof on a plane parallel to Fig. 1, and Fig. 3 is a detail section of the lower portion of the filter on a plane at right angles to that of Figs. 1 and 2 and illustrates the construction of the valves.

My filter consists, essentially, of a chamber adapted to contain filtering material, which material is preferably in the form of a disk adapted to fit closely within said chamber, said chamber being provided with inlet and outlet passages, each of which is connected by branches with the said chamber on both sides of the filtering material, and in said inlet and outlet passages are valves by which water may be caused to flow through the filtering material either in the normal or in the reverse direction at will or may be caused to flow through the chamber without passing through the filtering material.

In the drawings, $a$ is the said chamber, adapted to contain the filtering material, and $b$ and $c$ are removable screw-caps by which the ends of the said chamber are closed normally. $d$ and $e$ are projections from said chamber, the first containing the inlet-passage $f$ and being provided with a screw-threaded portion whereby it may be screwed upon the faucet. The projection $e$ contains the outlet-passage $g$. There are two branch passages $h$ and $i$ communicating with the interior of the chamber $a$ on opposite sides of the position of the filtering material within said chamber and adapted to be connected with the inlet-passage $f$ by means of an ordinary rotary plug-valve $k$, which is capable of connecting either of said branch passages with the inlet-passage, but not of connecting both simultaneously therewith. There are corresponding branch passages $l$ and $m$, either one of which may be placed in communication with the outlet-passage $g$ by means of a rotary plug-valve $n$.

$o$ designates the filtering material. For this material I prefer to use asbestos or asbestic material in the form of a disk adapted to fit closely within the chamber $a$ of the filter and having some slight elasticity. Asbestos is a good filtering material and has the important advantage that it is not subject to decomposition and may be rendered perfectly aseptic by the application of heat without injury; but I do not limit myself to the use of asbestos and may employ other well-known filtering materials instead.

The filtering-disk $o$ is located between two perforated plates $p$ and $q$. Plate $q$ abuts against an internal ring or flange $r$ of the chamber $a$. The screw-cap $b$ is provided with projections $s$, which when said screw-cap is in place press the perforated plate $p$ against the filtering-disk $o$ and so press the latter against the perforated plate $q$. Both of these perforated plates are provided on their sides adjacent to the disk with projecting flanges $t$, which being narrow depress the filtering material slightly, because of its slight elasticity, and thus hold it firmly in place, at the same time pressing the material against the walls of the chamber $a$, so as to prevent the passage of water around the disk. Screw-caps $b$ and $c$ may be interchangeable and are so shown in the drawings, and for this reason screw-cap $c$ may be provided with projections $s$, similar in every respect to those of screw-cap $b$, although the said projections of screw-cap $c$ have no function.

The operation of my filter is as follows: In Fig. 2 the valves $k$ and $n$ are shown in the filtering position—that is to say, the position in which water will be caused to pass through the filtering material. Such water passing downward through the inlet-passage $f$ and through the port of the valve $k$ and the branch passage $h$ percolates through the filtering material $o$, and then passes outward through passages $m$ and $g$ and the port of valve $n$. To clean the filter, valves $k$ and $n$ may be reversed, thus causing the water to flow through the filtering material in the reverse direction, and if this water be heated to near the boiling-point disease germs and the like which may be within the filtering material will be killed, or the flow of water having been cut off at the faucet to which the filter is connected the screw-caps $b$ and $c$ may be removed and then the filtering-disk itself may be removed and purified by heating it or in any other suitable way, and in the same way the filtering-disk may be removed when worn out and a new disk substituted therefor.

If it be desired to permit free flow of hot or cold water through the filter without passing such water through the filtering material, the valve $n$ may be reversed, the valve $k$ being retained in the position shown in the drawings, or the valve $k$ may be reversed and the valve $n$ retained in the position shown in the drawings.

Having thus completely described my invention, what I claim, and desire to secure by Letters Patent, is—

1. In a filter, the combination, with a filtering-chamber, adapted to contain a disk of filtering material, and having inlet and outlet passages each provided with branches communicating with the filtering-chamber upon opposite sides of the filtering-disk, of valves controlling the flow of water through such branches, a disk of elastic filtering material adapted to fit closely within said chamber, perforated supporting-plates therefor, said plates having flanges on the sides adjacent to the filtering-disk, whereby said disk may be pressed against the walls of the filtering-chamber, and means for pressing said plates against said disk.

2. In a filter, the combination, with a filtering-chamber, adapted to contain a disk of filtering material, and provided with removable caps upon the opposite sides of said disk, inlet and outlet passages, each of said passages being provided with branches communicating with the chamber upon opposite sides of the position of the filtering-disk, of valves controlling the flow of water through said branches, a disk of filtering material within said chamber, and perforated supporting-plates therefor, one abutting against a projection of the wall of the filtering-chamber, the screw-cap adjacent to the other of said supporting-plates having projections whereby it may press said supporting-plate against the filtering-disk, and thereby press said disk against the other supporting-plate.

In testimony whereof I affix my signature in the presence of two witnesses.

JOSEPH F. GEISLER.

Witnesses:
H. M. MARBLE,
A. H. PERLES.